United States Patent [19]

Donaldson et al.

[11] Patent Number: 4,829,515
[45] Date of Patent: May 9, 1989

[54] HIGH PERFORMANCE LOW PIN COUNT BUS INTERFACE

[75] Inventors: Darrel D. Donaldson, Lancaster; Richard B. Gillett, Jr., Westford; Douglas D. Williams, Pepperell, all of Mass.

[73] Assignee: Digital Equipment Corporation, Maynard, Mass.

[21] Appl. No.: 44,467

[22] Filed: May 1, 1987

[51] Int. Cl.⁴ .............................................. H04J 3/02
[52] U.S. Cl. ....................................................... 370/85
[58] Field of Search ...................... 370/85, 86, 88, 95, 370/89

[56] References Cited

U.S. PATENT DOCUMENTS

| | | |
|---|---|---|
| 3,585,399 | 6/1971 | Andrews, Jr. |
| 4,347,600 | 8/1982 | Abbott et al. |
| 4,376,998 | 3/1983 | Abbott et al. |
| 4,408,333 | 10/1983 | Fujii |
| 4,409,671 | 10/1983 | Daniels et al. |
| 4,414,480 | 11/1983 | Zasio |
| 4,417,163 | 11/1983 | Otsuki et al. |
| 4,471,243 | 9/1984 | Isham |
| 4,486,753 | 12/1984 | Saeki et al. |
| 4,542,305 | 9/1985 | Blauschild |
| 4,558,237 | 12/1985 | Rabe et al. |
| 4,587,441 | 5/1986 | Torelli |
| 4,608,504 | 8/1986 | Yamamoto |
| 4,623,886 | 11/1986 | Livingston ........................... 370/85 |
| 4,625,126 | 11/1986 | Tinker |
| 4,645,947 | 2/1987 | Prak |
| 4,719,621 | 1/1988 | May ...................................... 370/85 |
| 4,737,953 | 4/1988 | Koch et al. ........................... 370/85 |

FOREIGN PATENT DOCUMENTS 0082980 6/1983 European Pat. Off.
01633305 4/1985 European Pat. Off.
59-247693 10/1985 Japan.

OTHER PUBLICATIONS

Stone, H. S., Microcomputer Interfacing, pp. 107–110.
G. D. Wisgo, Clock Signal Generator, IBM Technical Disclosure Bulletin, vol. 25, No. 9, pp. 4735–4736 (Feb. 1983).
C. Tyndale-Biscoe et al, Eurobus, An Interface Standard Microcomputer Systems, Implementing Functions: Microprocessors and Firmware, 7th Eruomicro Symposium on Microprocessing and Microprogramming, pp. 181–190, (Sep. 1981).

Primary Examiner—Robert L. Griffin
Assistant Examiner—Wellington Chin
Attorney, Agent, or Firm—Finnegan, Henderson, Farabow, Garrett, & Dunner

[57] ABSTRACT

An interface system between a high speed user bus and a system bus is provided to present to the user bus a picture of the data transferred on the system bus every clock cycle of that system bus. The interface system also allows the user bus to transfer data back to the system bus during selected bus cycles. By using a single pin connection to the system bus, the user bus can send communications back to itself by way of the system bus.

14 Claims, 8 Drawing Sheets

HIGH PERFORMANCE LOW PIN COUNT BUS INTERFACE

BACKGROUND OF THE INVENTION

This invention is related to U.S. Pat. No. 4,774,422, filed on May 1, 1987, by Darrel D. Donaldson, Richard B. Gillett, Jr., and Douglas D. Williams entitled "High Speed Low Pin Count Interface."

The present invention relates to the field of computer data buses generally and more specifically to high speed buses which allow bidirectional communication. In most buses, especially buses that contain multiple lines to transfer data in a parallel format, there are windows of time during which data on the bus is valid. In synchronous buses, periodically repeating cycles form the basis for timing of such buses and in each of those cycles windows are usually defined by a separate signal which becomes active once per bus cycle. During the time between windows, the data on the bus is allowed to change to new levels and is considered to be invalid.

In general, data communication on a bus involves a bus driver to place data onto the bus and a storage device to retrieve and store data from the bus. The bus driver, can generally be one of two types. One type can only drive a bus line to one level, e.g., to a ground potential, and thus requires a pull-up or precharging drives to establish the other bus level. The other type actively drive the bus line to both levels and does not require precharging or pull-up devices. When a drive signal controlling the bus driver is in one state, it enables the bus driver and causes the bus driver to drive the bus to a level (either the same or inverted) corresponding to input data at the input terminal of the bus driver. When the drive signal is in the other state, it disables the bus driver causing the bus driver to cease driving the bus. Immediately following the enabling of the bus driver, while the data on the bus is still changing, the data is also considered to be invalid. For each particular driver technology and interface characteristics, this data invalid time is relatively fixed, as it depends on conditions like bus length, bus driver propagation delay, etc. As bus frequencies increase, the cycle times of the bus decreases, and the bus driver enable time decreases correspondingly. Thus, the amount of the bus driver enable time during which data is valid also decreases.

The storage device responds to the actuation of a latch signal by storing the data currently on the bus. The latch signal must be timed so that the storage device stores data while it is still valid on the bus, and conventional practice is to time the latch signal so that the storage device stores data while the bus driver is still enabled. Thus the conventional drive signal continues to drive the bus for some "hold time" after the latch signal is actuated. Conventional practice for driving buses between sets of integrated circuit chips is to actuate the latch prior to disabling the bus driver because the voltage levels on the bus may be indeterminate when the bus is not being driven, and during such times the storage device may not actually store the data intended to be transferred over the bus from the bus driver.

Generation of the bus driver and latch signals to obtain the hold time requires two separate clock signals: one for the latch signal and one for the drive signal which extends beyond the latch signal. Those two clock signals, however, are only sufficient for unidirectional communication on the bus lines. Full bidirectional communication on the same bus lines requires two storage device/bus driver pairs, as well as four clock signals (two signals for each direction).

Furthermore, the drive signal used for communication in one direction on the bus must not overlap the drive signal used for communication in the other direction so that the bus drivers used for communication in each direction are not driving the bus simultaneously. If they do drive the bus simultaneously even for only a small amount of time because of clock skew, for example, then the drivers and the bus lines will experience current spikes, and the availability of the data transferred by the second drive signal will be delayed.

The generation of the multiple clocks for bidirectional communication is further complicated if that communication must be synchronized to an overall system clock. For example, if there were a system bus with its own bus timing coupled to one of the elements of the bus, then the four clock signals necessary for bidirectional communication would have to be synchronized with the timing of this system bus. Such synchronization ma be difficult for several reasons. First, the cycle time of the clock used for the system bus may be so small as to make it impractical to further subdivide the clock cycle time to obtain four different clock signals conforming to the requirements for bidirectional communication. Furthermore, even if it were possible to obtain those clock signals, their pulse widths may be so narrow that logic circuitry in the elements could not reliably respond to them.

One design approach would be to eliminate the need for the four separate clock signals by using two unidirectional buses, one for communication in each direction. The addition of another set of lines for the other unidirectional bus, however, doubles both the number of bus lines and the area which must be dedicated for those lines. In addition, the use of such buses doubles the number of pins on the components which couple to that bus. Thus, for example, to transfer 64 bits of data in parallel using two unidirectional buses would require an additional 64 pins per interface as compared to a single bidirectional bus.

Of all these disadvantages, the increased pin count may be the most severe. If the number of pins required exceeds the number that can be supported in a single integrated chip, then multiple chips must be used for the circuitry. This can be disadvantageous because circuitry generally operates more slowly when divided between multiple chips. Thus, the design of high speed circuitry frequently involves the development of techniques that minimize the required number of pins to avoid dividing functions across chip boundaries. Pin counts are often a limiting factor in circuit design because of limited space for those pins on printed circuit boards.

Another desirable design goal for a high speed bus interface between two buses, such as a dedicated user bus and a main system bus, is to place on the user bus a copy of all the communications on the main system bus. This allows circuitry coupled to the user bus to monitor the use of different resources on the main system bus. To meet this requirement, data must be transferred from the system bus to the user bus during each cycle of the system bus. If the user bus uses single lines for bidirectional communication, then that bus must operate twice as fast as the system bus to allow two communications (one each direction) during each cycle of the system bus cycles. This requirement further exacerbates the timing problems.

If the user bus can be synchronized with the system bus and reproduce the traffic on the system bus, including messages placed on the system bus from the user bus, several advantages are available. One advantage of this system is that one user of the system bus can monitor the system bus transactions of all the other users. For example, one user can ensure that its cache memories are valid by checking all the memory write operations of the other users. Users can observe their own system bus transactions in relationship to the system bus transactions of other users. In addition, users can send messages to themselves over the system bus to permit easy coordination of node resources, such as system bus control and status registers, that are accessible over the sytem bus.

Accordingly, it is an object of the present invention to minimize the number of clock signals needed for high speed bidirectional bus transfer without driver overlap.

Another object of the present invention is to provide high speed data transfer between two buses so that one bus can obtain a copy of all traffic on another bus.

Yet another object of the invention is to provide one bus with a return copy of the messages it sent to the other bus.

A still further object of the invention is to minimize the number of pins needed for an interface to a high speed system bus.

Additional objects and advantages of the invention will be set forth in part in the description which follows, and in part will be obvious from the description, or may be learned by practice of the invention. The objects and advantages of the invention may be realized and obtained by the instrumentalities and combinations particularly pointed out in the appended claims.

II. SUMMARY OF THE INVENTION

The present invention overcomes the problems and disadvantages of the prior art by providing bidirectional transfer between pin terminals by carefully controlling the timing of the transfers in each direction.

To achieve the objects and in accordance with the purpose of the invention, as embodied and broadly described herein, an interface system of this invention provides bidirectional communication for a node and a system bus propagating data during repetitive bus cycles, the node having a user portion for processing the data. The interface system comprises: a node bus, coupled to the user portion, for transferring the data in parallel; transceiver means, coupled between the node bus and the system bus, for providing bidirectional communication between the system bus and the node bus and for providing to the node bus a copy of all of the data propagated on said system bus and timing means. The transceiver means includes first unidirectional communications means, responsive to active portions of a first clock signal occurring once each system bus cycle and having input terminals coupled to the node bus and output terminals coupled to the system bus, for receiving data from the node bus for later transfer to the system bus during selected cycles of the system bus, and second unidirectional communication means, responsive to active portions of a second clock signal occurring once each system bus cycle and having input terminals coupled to the system bus and output terminals coupled to the node bus for transferring the data propagated on the system bus to the node bus once every cycle of the system bus, each of the input terminals being connected to a different one of the output terminals of the first unidirectional communications means and each of the output terminals being connected to a different one of the input terminals of the first unidirectional communications means. The timing means is coupled to the first and second unidirectional communication means and provides the first and second clock signals so that the active portions of the first and second clock signals do not occur simultaneously and so that the active portions of the second clock signals cause the second unidirectional communication means to return to the node bus a copy of the data transferred to the system bus from the node bus.

The accompanying drawings, which are incorporated in and constitute a part of this specification, illustrate an embodiment of the invention and together with the description serve to explain the principles of the invention.

III. BRIEF DESCRIPTION OF THE DRAWINGS

IV. DETAILED DESCRIPTION OF THE PREFERRED EMBODIMENT

Reference will now be made in detail to a preferred embodiment of the invention, an example of which is illustrated in the accompanying drawings.

A. System Overview

Figure 1:
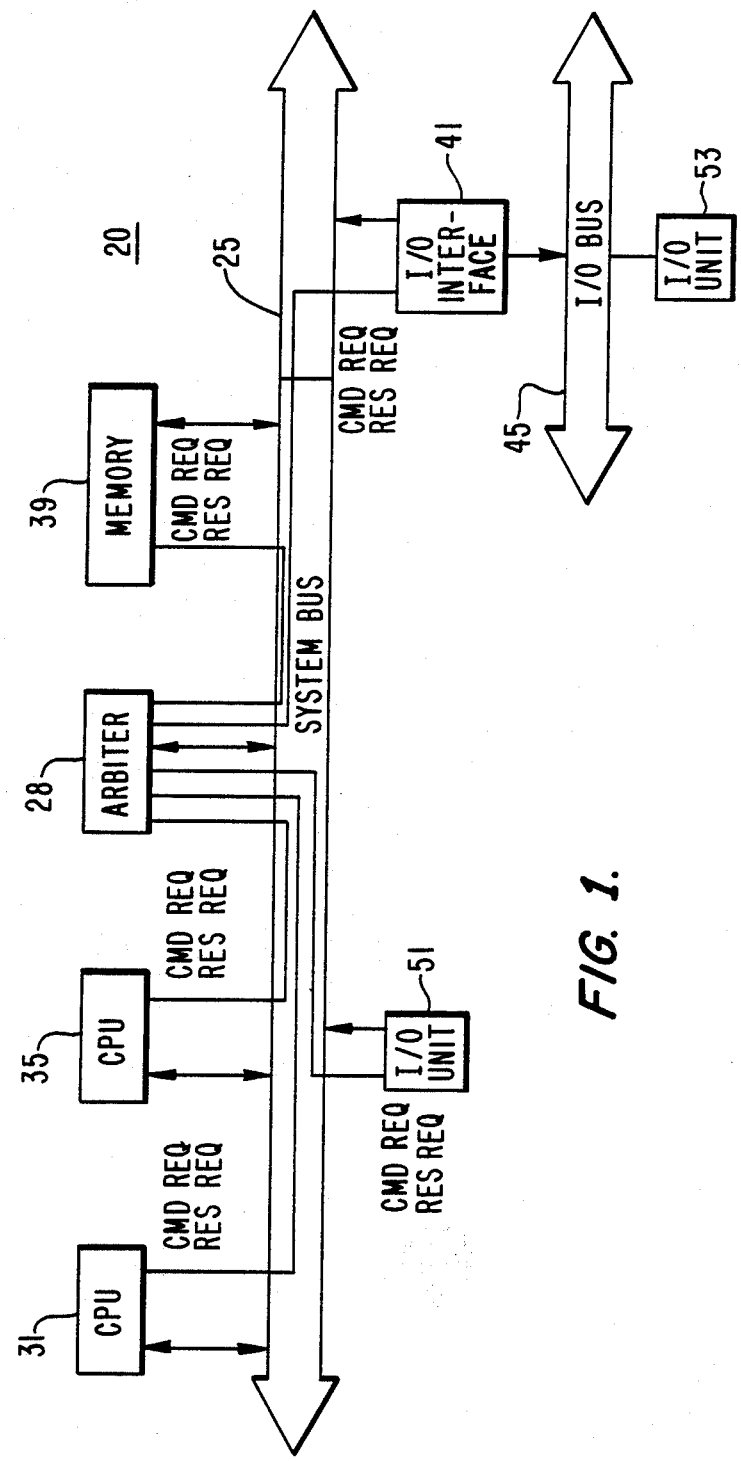
FIG. 1 is a block diagram of a data processing system including a system bus using the present invention.

FIG. 1 shows an example of a data processing system 20 which embodies the present invention. The heart of system 20 is a system bus 25 which is a synchronous bus that allows communication between several processors, memory subsystems, and I/O systems. Communications over system bus 25 occur synchronously using periodic bus cycles. A typical bus cycle time for system bus 25 is 64 nsec.

In FIG. 1, system bus 25 is coupled to two processors 31 and 35, a memory 39, one I/O interface 41 and one I/O unit 51. I/O unit 53, is coupled to system bus 25 by way of I/O bus 45 and I/O unit interface 41.

A central arbiter 28 is also connected to system bus 25 in the preferred embodiment of data processing system 20. Arbiter 28 provides certain timing and bus arbitration signals directly to the other devices on system bus 25 and shares some signals with those devices.

The implementation shown in FIG. 1 is one which is presently preferred and should not necessarily be interpreted as limiting the present invention. For example, I/O unit 53 could be coupled directly to system bus 25, and arbiter 28 need not operate in the manner described for the present invention.

In the nomenclature used to describe the present invention, processors 31 and 35, memory 39, and I/O interface 41, and I/O device 51 are all called nodes. A "node" is defined as a hardware device which connects to system bus 25. A typical node 60 is shown in greater detail in FIG. 2.

According to the nomenclature used to describe the present invention, the terms "signals" or "lines" are mainly used interchangeably to refer to the names of the physical wires. The terms "data" or "levels" are mainly used to refer to the values which the signals or lines can assume.

Nodes perform transfers with other nodes over system bus 25. A "transfer" is one or more contiguous cycles that share a common transmitter and common arbitration. For example, a read operation initiated by one node to obtain information from another node on system bus 25 requires a command transfer from the first to the second node followed by one or more return data transfers from the second node to the first node at some later time.

A "transaction" is defined as the complete logical task being performed on system bus 25 and can include more than one transfer. For example, a read operation consisting of a command transfer followed later by one or more return data transfers is one transaction. In the preferred embodiment of system bus 25, the permissible transactions support the transfer of different data lengths and include read, write (masked), interlock read, unlock write, and interrupt operations. The difference between an interlock read and a regular or noninterlock read is that an interlock read to a specific location retrieves information stored at that location and restricts access to the stored information by subsequent interlock read commands. Access restriction is performed by setting a lock mechanism. A subsequent unlock write command stores information in the specified location and restores access to the stored information by resetting the lock mechanism at that location. Thus, the interlock read/unlock write operations are a form of read-modify-write operation.

Since system bus 25 is a "pended" bus, it fosters efficient use of bus resources by allowing other nodes to use bus cycles which otherwise would have been wasted waiting for responses. In a pended bus, after one node initiates a transaction, other nodes can have access to the bus before that transaction is complete. Thus, the node initiating that transaction does not tie up the bus for the entire transaction time. This contrasts with a non-pended bus in which the bus is tied up for an entire transaction. For example in system bus 25, after a node initiates a read transaction and makes a command transfer, the node to which that command transfer is directed may not be able to return the requested data immediately. Cycles on bus 25 would then be available between the command transfer and the return data transfer of the read transaction. System bus 25 allows other nodes to use those cycles.

In using system bus 25, each of the nodes can assume different roles in order to effect the transfer of information. One of those roles is a "commander" which is defined as a node which has initiated a transaction currently in progress. For example, in a write or read operation, the commander is the node that requested the write or read operation; it is not necessarily the node that sends or receives the data. In the preferred protocol for system bus 25, a node remains as the commander throughout an entire transaction even though another node may take ownership of the system bus 25 during certain cycles of the transaction. For example, although one node has control of system bus 25 during the transfer of data in response to the command transfer of a read transaction, that one node does not become the commander of the bus 25. Instead, this node is called a "responder."

A responder responds to the commander. For example, if a commander initiated a write operation to write data from node A to node B, node B would be the responder. In addition, in data processing system 20 a node can simultaneously be a commander and a responder.

Transmitters and receivers are roles which the nodes assume in an individual transfer. A "transmitter" is defined as a node which is the source of information placed on system bus 25 during a transfer. A "receiver" is the complement of the transmitter and is defined as the node which receives the information placed on system bus 25 during a transfer. During a read transaction, for example, a commander can first be a transmitter during the command transfer and then a receiver during the return data transfer.

When a node connected to system bus 25 desires to become a transmitter on system bus 25, that node asserts one of two request lines, CMD REQ (commander request) and RES REQ (responder request), which are connected between central arbiter 28 and that particular node. The CMD REQ and RES REQ lines are shown generally in FIG. 1. In general, a node uses its CMD REQ line to request to become commander and initiate transactions on system bus 25, and a node uses its RES REQ line to become a responder to return data or message to a commander. Generally, central arbiter 28 detects which nodes desire access to the bus (i.e., which request lines are asserted). The arbiter then responds to one of the asserted request lines to grant the corresponding node access to bus 25 according to a priority algorithm. In the preferred embodiment, arbiter 28 maintains two independent, circular queues: one for the commander requests and one for the responder requests. Preferably, the responder requests have a higher priority than the commander requests and are handled before the commander requests.

The commander request lines and responder request lines are considered to be arbitration signals. As illustrated in FIG. 1, and as will be explained in greater detail in the description of FIG. 6, arbitration signals also include point-to-point conditional grant signals from central arbiter 28 to each node, system bus extend signals to implement multi-bus cycle transfers, and system bus suppression signals to control the initiation of new bus transactions when, for example, a node such as memory is momentarily unable to keep up with traffic on the system bus.

Other types of signals which can constitute system bus 25 include information transfer signals, respond signals, control signals, console/front panel signals, and a few miscellaneous signals. Information transfer signals include data signals, function signals which represent the function being performed on the system bus 25 during a current cycle, identifier signals identifying the commander, and parity signals. The respond signals generally include acknowledge or confirmation signals from a receiver to notify the transmitter of the status of the data transfer.

Control signals include clock signals, warning signals, such as those identifying low line voltages or low DC voltages, reset signals used during initialization, node failure signals, default signals used during idle bus cycles, and error default signals. The console/front panel signals include signals to transmit and receive serial data to a system console, boot signals to control the behavior of a boot processor during power-up, signals to enable modification of the erasable PROM of processors 31, 35 on system bus 25, a signal to control a RUN LIGHT on the front panel, and signals providing battery power to clock logic on certain nodes. The miscellaneous signals, in addition to spare signals, include identification signals which allow each node to define its identification code.

Figure 2:
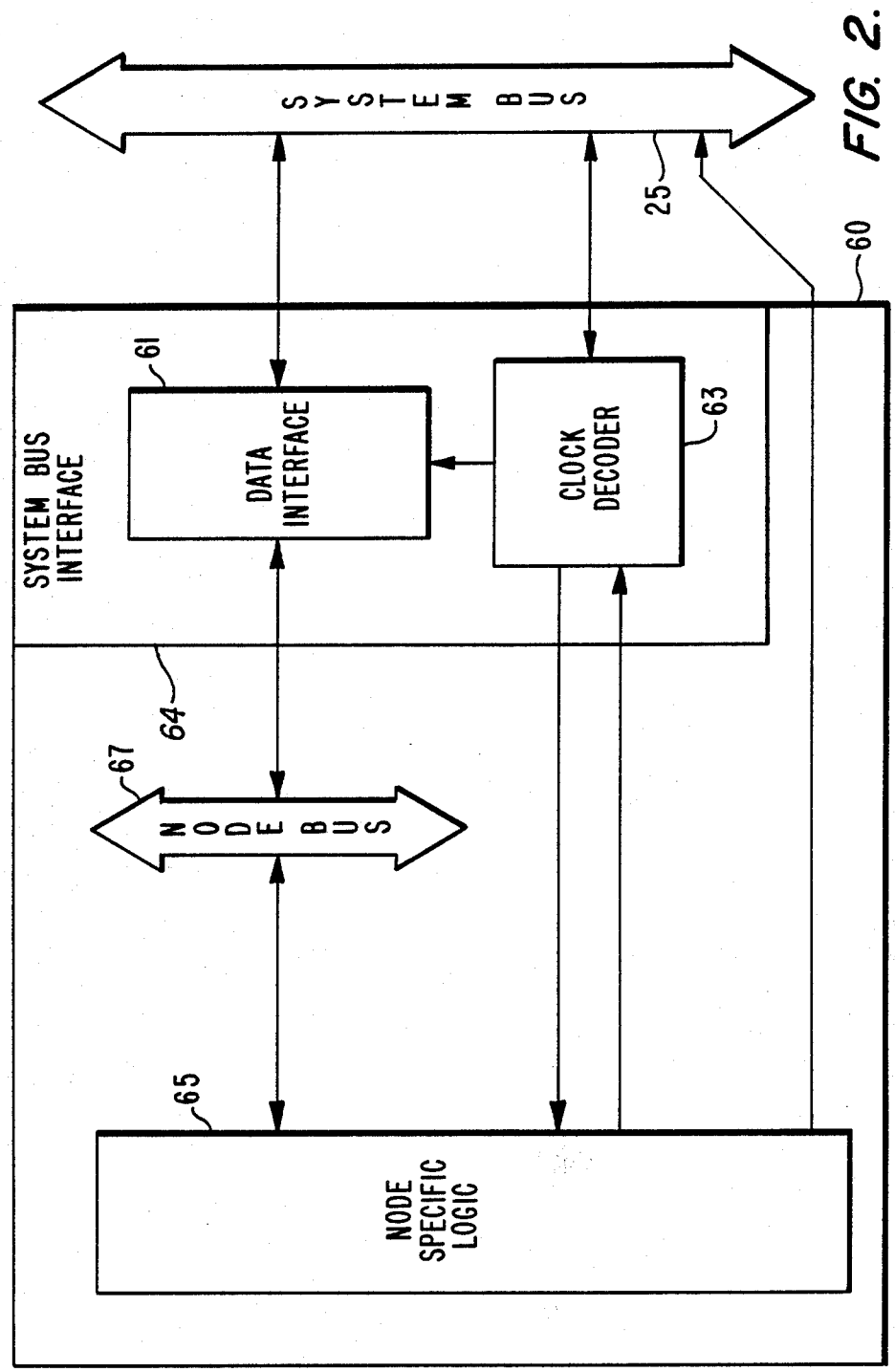
FIG. 2 is a block diagram of a node in the data processing system of FIG. 1.

FIG. 2 shows an example of a node 60 connected to system bus 25. Node 60 could be a processor, a memory, an I/O unit or an I/O interface as shown in FIG. 1. In the example shown in FIG. 2, node 60 includes node specific logic 65, a node bus 67, and a system bus interface 64 containing a data interface 61 and a clock decoder 63. Preferably, data interface 61, clock decoder 63, and node bus 67 are standard elements for nodes connected to system bus 25. The node specific logic 65, which uses different integrated circuits from system bus interface 64, preferably includes, in addition to the circuitry designed by a user to carry out the specific function of a node, standard circuitry to interface with the node bus 67. In general, data interface 61 is the primary logical and electrical interface between node 60 and system bus 25, clock decoder 63 provides timing signals to node 60 based on centrally generated clock signals, and node bus 67 provides a high speed interface between data interface 61 and node specific logic 65.

In the preferred embodiment of node 60 and system bus interface 64 shown in FIG. 2, clock decoder 63 contains control circuitry for forming signals to be placed on system bus 25 and processes clock signals received from central arbiter 28 to obtain timing signals for node specific logic 65 and data interface 61. Since the timing signals obtained by clock decoder 63 use the centrally generated clock signals, node 60 will operate synchronously with system bus 25.

Figure 3:
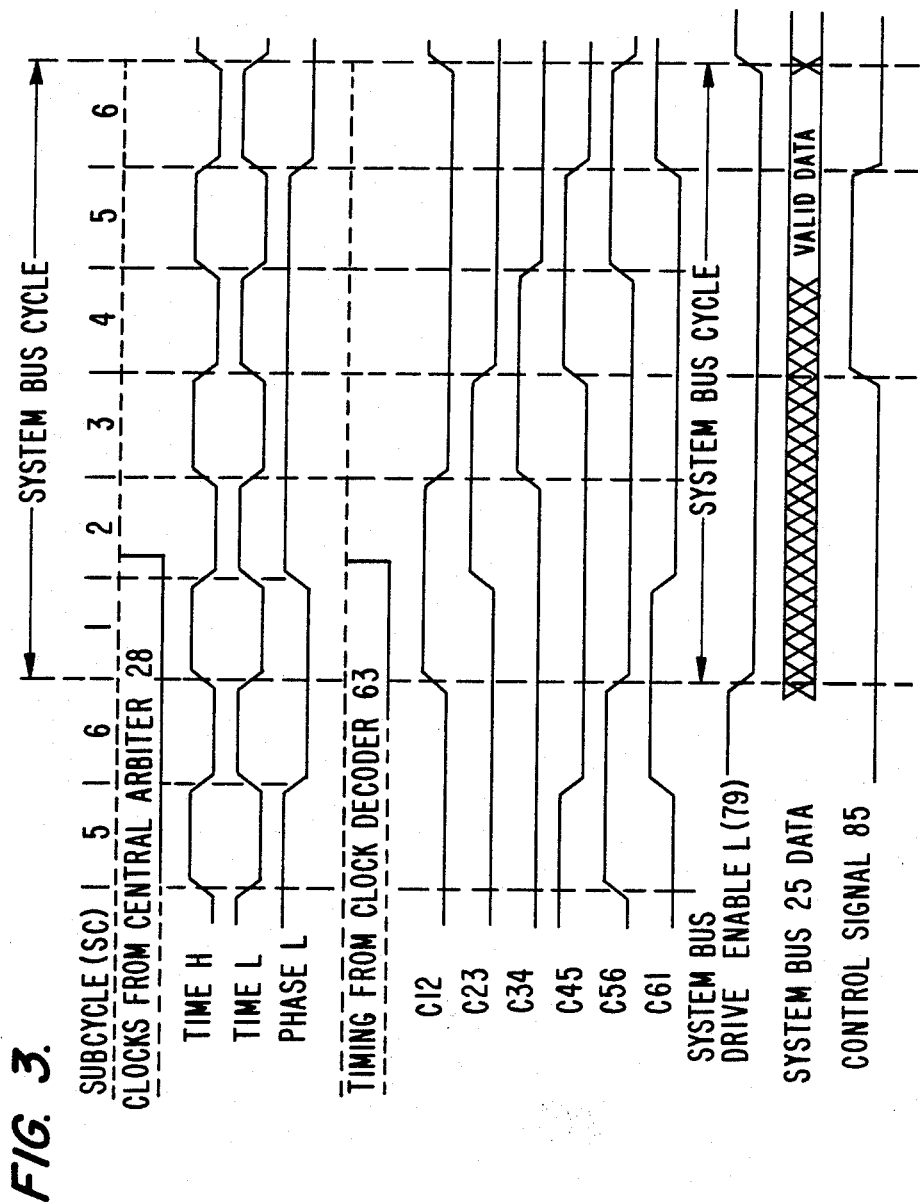
FIG. 3 is a timing diagram showing timing signals used in the data processing system of FIG. 1.

FIG. 3 is a timing diagram showing one bus cycle, the clock signals received by clock decoder 63 from central arbiter 28 (FIG. 1); and certain of the timing signals generated by clock decoder 63. The clock signals received by clock decoder 63 include a Time H signal, a Time L signal, and a Phase signal as shown in FIG. 3. Time H and Time L are inverses of the fundamental clock signals and the Phase signal is obtained by dividing the fundamental clock signal by three. The timing signals generated by clock decoder 63 include C12, C23, C34, C45, C56 and C61, all of which are shown in FIG. 3. Those timing signals required by data interface 61, which occur once per bus cycle, are provided to data interface 61, and a complete set of timing signals, including equivalent ones of the timing signals provided to data interface 61, is buffered and provided to the node specific logic 65. The purpose of buffering is to insure that node specific logic 65 cannot adversely affect the operation of the system bus interface 64 by improperly loading the timing signals. Clock decoder 63 uses the clock signals to create six subcycles for each bus cycle and then uses the subcycles to create the six timing signals CXY, where X and Y represent two adjacent subcycles which are combined to form one timing signal.

Each node in the system bus 25 has its own corresponding set of timing signals generated by its clock decoder 63. While nominally the corresponding signals occur at exactly the same time in every node throughout the system 20, variations between clock decoder 63 and other circuitry in multiple nodes introduce timing variations between corresponding signals. These timing variations are commonly known as "clock skew."

Figure 4:
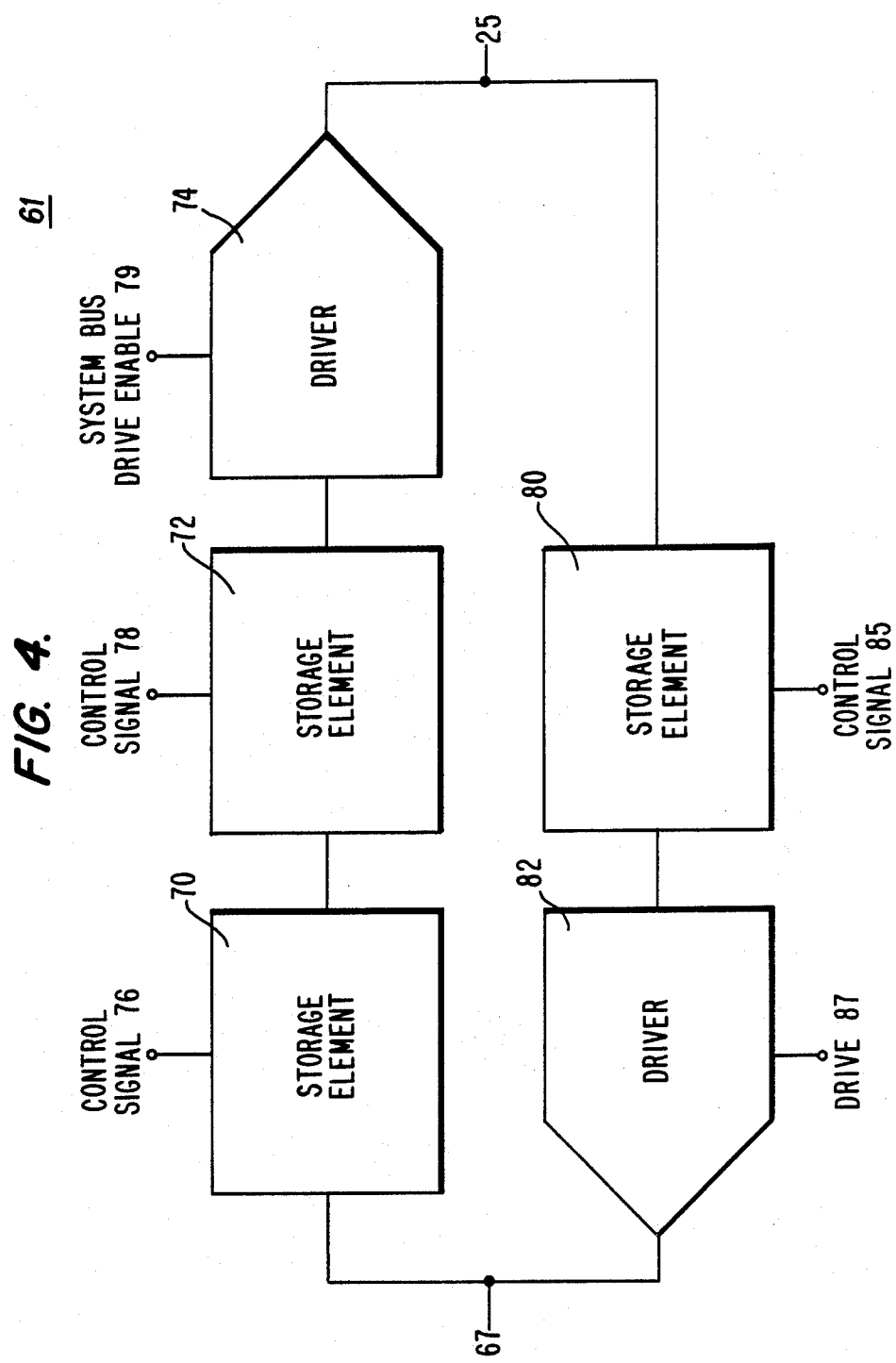
FIG. 4 is a block diagram of the data interface in the node of FIG. 2.

FIG. 4 shows a preferred embodiment of data interface 61. Data interface 61 contains both temporary storage circuitry and bus driver circuitry to provide a bidirectional and high speed interface between each of the lines of node bus 67 and each of the lines of system bus 25. As shown in FIG. 4, data interface 61 preferably includes storage elements 70 and 72 and system bus driver 74 to provide a communication path from node bus 67 to system bus 25. Data interface 61 also includes storage element 80 and node bus driver 82 to provide communication path from system bus 25 to node bus 67. As used in the description of data interface 61, the term "storage element" refers generally to bistable storage devices such as a transparent latch or a master-slave storage element, and not to a specific implementation. Persons of ordinary skill will recognize which types of storage elements are appropriate.

As shown in FIG. 4, storage element 70 has an input connected to receive data from node bus 67 and an output connected to the input of storage element 72. The output of storage element 72 is connected to an input of system bus driver 74 whose output is connected to system bus 25. Storage elements 70 and 72 are controlled by node bus control signals 76 and 78, respectively, which are derived from the timing signals generated by clock decoder 63. Storage elements 70 and 72 provide a two-stage temporary storage for pipelining data from node bus 67 to system bus 25. Different numbers of storage stages can also be used.

System bus drive 74 is controlled by system bus driver enable 79. According to the state of the system bus drive enable 79, the input of system bus driver 74 either is coupled to its output, thereby transferring the data at the output of storage element 72 to system bus 25, or decoupled from that output. When system bus drive enable 79 decouples the input and output of the system bus driver 74, system bus driver 74 presents a high impedance to system bus 25. The system bus drive enable 79 is also generated by clock decoder 63 in accordance with clock signals received from system bus 25 and control signals received from the node specific logic 65.

Storage element 80 has an input terminal connected to system bus 25 and an output terminal connected to an input of node bus driver 82. The output of node bus driver 82 is connected back to node bus 67. Storage element 80, preferably a transparent latch, is controlled by a system bus control signal 85 which is derived from the timing signals generated by clock decoder 63. A node bus drive signal 87 controls node bus driver 82 similar to the manner in which system bus drive signal 79 controls system bus drive 74. Thus, in response to node bus driver signal 87, node bus driver 82 either couples its input to its output or decouples its input from its output and provides a high impedance to node bus 67.

In order to explain how data is transferred over system bus 25, it is important to understand the relationship between system bus drive enable 79 and control signal 85. In the present embodiment, this relationship is shown in FIG. 3. System bus drive enable 79 is nominally driven from the beginning to the end of a bus cycle. The new data become available for receipt from system bus 25 at some time later in the bus cycle after driver propagation and bus settling time has occurred. In the present embodiment, storage element 80 is a transparent latch. Control signal 85 is logically equivalent to clock C45. The bus timing assures that system bus 25 data is available for receipt sometime prior to the deassertion of control signal 85. Storage element 80 stores bus data that is stable at least a set-up time prior to the deassertion of control signal 85 and remains stable a hold time after the deassertion of control signal 85.

Node bus 67 is preferably a very high speed data bus which allows bidirectional data transfer between the node specific logic 65 and system bus 25 by way of data interface 61. In the preferred embodiment of node 60 shown in FIG. 2, node bus 67 is an interconnect system consisting of point-to-point connections between the system bus interface 64 and the node specific logic 65. In accordance with the present invention, however, there is no requirement for such point-to-point interconnection.

Figure 5:
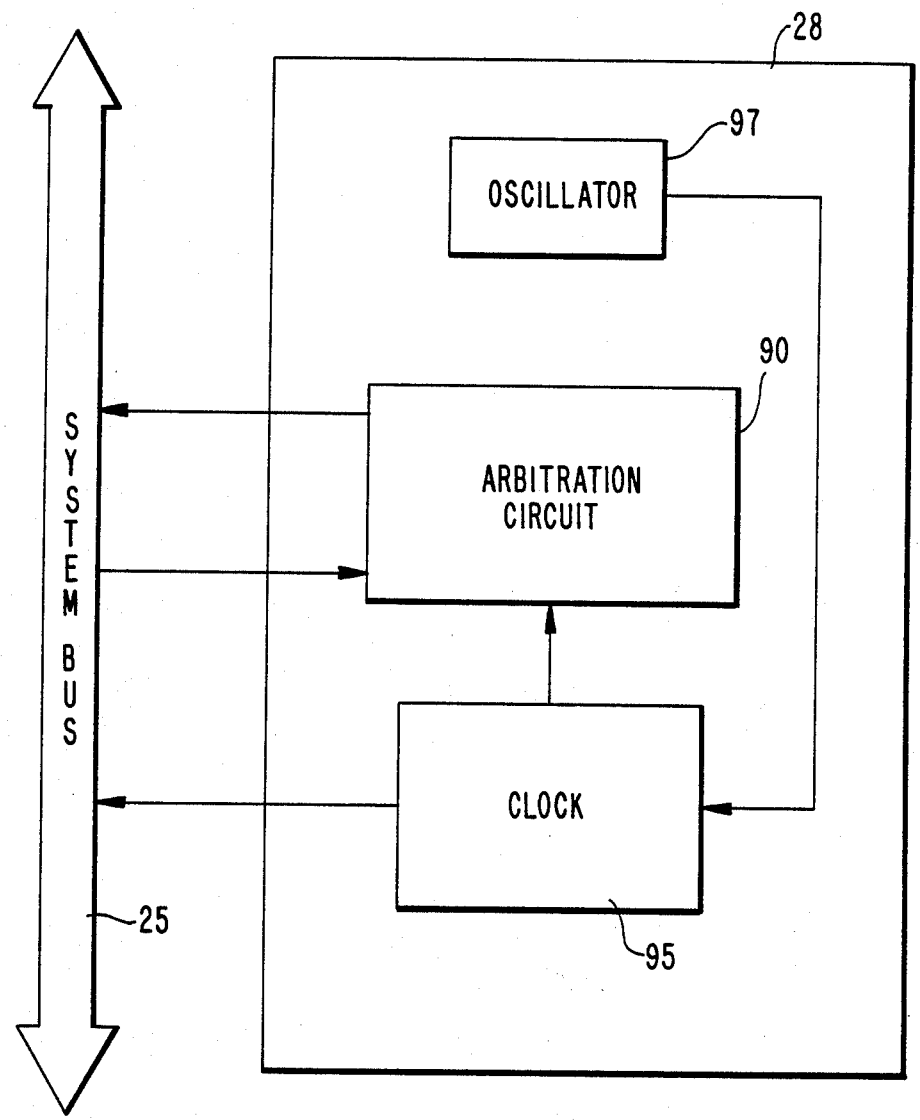
FIG. 5 is a block diagram of the arbiter in the data processing system of FIG. 1.

FIG. 5 shows a preferred embodiment of the central arbiter 28 which is also connected to system bus 25. Central arbiter 28 provides the clock signals for system bus 25 and grants ownership of the bus to the nodes on system bus 25 ownership of that bus. Central arbiter 28 preferably includes an arbitration circuit 90, a clock circuit 95, and a oscillator 97. Oscillator 97 generates the fundamental clock signals. Clock 95 provides timing signals for arbitration circuit 90 and the basic Time H, Time L, and Phase clock signals for timing on system bus 25. Arbitration circuit 71 receives the commander and responder request signals, arbitrates conflicts between nodes desiring access to system bus 25, and maintains the queues referred to above for the commander and responder requests. Arbitration circuit 90 also provides certain control signals to clock 95.

B. Bus Interface Circuitry

In node 60, as shown in FIGS. 2 and 4, each data interface 61 is coupled to a corresponding line of system bus 25 by a single pin terminal. The connection can be direct but is preferably through a resistance for reasons not relevant to an understanding of the present invention. For the reasons explained in the Background of Invention, it is desirable that each data interface 61 also be coupled by a single pin terminal to a corresponding line of node bus 67 for those lines of node bus 67 which correspond to the lines of system bus 25. By using single pin terminals, node bus 67 can be a single bidirectional bus instead of two parallel buses, and the number of pins or terminals needed is thus minimized. In addition, the circuitry connected to node bus 67 need not be divided among several integrated circuit chips only to satisfy increased pin count needed to interface to two parallel buses.

In addition, for the reasons explained in the Background of the Invention, the design of circuitry to accomplish a single pin terminal to single pin terminal, bidirectional transfer is complicated by the desire to place on node bus 67 a copy of all the data or messages from system bus 25, including the data on system bus 25 provided by node 60. Doing so allows the node specific logic 65 to view all the data or messages on system bus 25 which in turn helps to manage system bus 25. By making available to node specific logic 65 all the data or messages on system bus 25, node 60 can use the knowledge of which resources of data processing system 20 are being used and by whom those processes are being used to implement certain self-management techniques for use of system bus 25.

In addition, the provision of bidirectional communications between data interface 61 and system bus 25 through a single pin terminal for each line of system bus 25 allows node specific logic 65 to monitor and receive its own messages to system bus 25. Such connection also allows node specific logic 65 to send a message to itself by way of system bus 25 so other nodes can monitor those transactions.

Another benefit of cycle by cycle visibility of system bus 25 to node bus 67 is to maintain cache coherency. With regard to this use, if a node modifies the contents at memory locations accessible through system bus 25, the other nodes can monitor such accesses and determine whether their own caches include copies of these memory locations.

To provide single pin terminal connection as well as bidirectional transfer capability during each cycle of system bus 25, node bus 67 must operate at twice the speed of system bus 25, as explained in the Background of Invention. Node bus 67 must therefore have shorter transfer times than system bus 25.

In the preferred embodiment of the invention, with a 64 nanosecond cycle time for system bus 25, only six subcycles are available due to the requirements of circuitry in, for example, system bus interface 64 which is composed of CMOS circuitry. Six timing signals, C12, C23, C34, C45, C56, and C61, each covering two subcycles, are formed for timing of node bus 67.

In the conventional method of bidirectional bus transfer requiring two pairs of clock signals, the timing necessary to form those signals is difficult to implement using the timing signals in FIG. 3 or any other signals based on the six subcycles. In fact, the implementation would only be possible by creating special timing signals for drivers which were longer than the timing signals shown in FIG. 3 (e.g., a three-subcycle long signal such as C123) or by creating latch control signals shorter than those timing signals (e.g., a single subcycle signal such as C1 or C2). In the first case, a high probability exists that two different drivers would drive the bus at the same time since the longer clock signals (e.g., C123 and C456) would need to be used to control the drivers and clock skew may cause those signals to overlap and drive the bus at the same time. In the second case, the shorter timing signals may not be long enough to be used effectively by the logic circuitry or to permit the data to propagate from the driver to the latch prior to actuation of the latch. Thus, a conventional bus driving method requires timing signals which may be obtained from a minimum of eight subcycles. This would allow two three-subcycle driver signals, separated by one subcycle to prevent overlap, and the latch control signals could lasts for the first two of the three-subcycle drive signals.

The present circuit avoids problems of bidirectional data transfer when there is a limited number of subcycles and other circuit constraints by using a phenomenon of bus lines which has not been previously exploited for the problem of data transfer across integrated chip boundaries. Each of the lines of node bus 67 has an inherent capacitance of typically 5–10 pf. The inventors have found that this inherent capacitance can be used to maintain the proper voltage levels on the bus lines even after the bus is no longer being actively driven to a particular level by a bus driver. To store charge in the bus line inherent capacitance, the impedance of the discharge paths of that capacitance must be high. In general, the discharge paths for a bus are through the driver outputs and storage element inputs connected to that bus. The inventors have found that by using devices with high input and output impedances, specifically CMOS devices which also add several picofarads of capacitance to the bus lines, the inherent capacitance of the bus lines can be used to extend the time during which the data placed in the bus is valid even after the drive signals are removed from the bus drivers.

Figure 6:
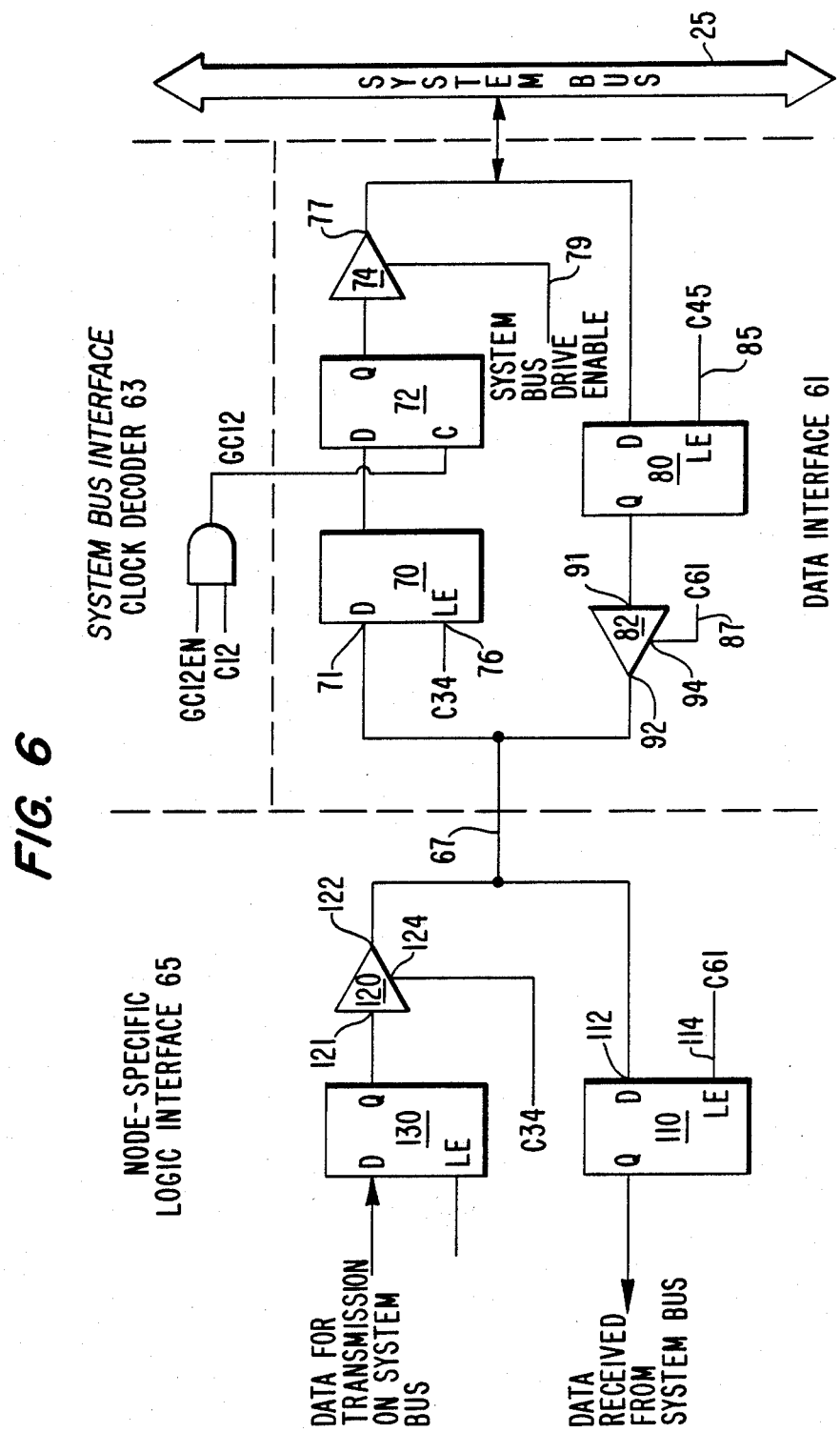
FIG. 6 is a detailed block diagram of the data interface in FIG. 2 and of interface circuitry for the node bus in FIG. 2.

The interface apparatus comprises a plurality of bus drivers each corresponding to a different line of the bus. Each of the drivers is capable of driving the corresponding bus line to either of two voltage levels. FIG. 6 shows an example of one line of bus 67 connected to circuitry in node specific logic 65 and in data interface 61. Bus driver 82, which has already been described, is shown as being coupled to that line of bus 67. Bus driver 82 includes an input terminal 91 for holding input data to be transmitted to the line of node bus 67 from storage element or latch 80, and a bus interface terminal 92 which is actually coupled to the line of node bus 67. Bus driver 82 also has an enable terminal 94 which receives a two-state drive signal, called DRIVE 87 in FIG. 4 and shown specifically as C61 in FIG. 6.

FIG. 3 shows the timing of signal C61. When C61 is high (the designation of levels is a convention and not a requirement), the output terminal 92 drives the corresponding line of node bus 67 to one of the levels according to the input data. When signal C61 is low, then the bus driver 82 ceases driving the bus line and presents to the line of node bus 67 a high impedance.

The interface apparatus also includes a plurality of latches each corresponding to a different line of the bus. As FIG. 6 shows, a storage element or latch 110 is coupled to the same line of node bus 67 as is driver 82. Storage element 110 has an input terminal 112 coupled to that line of node bus 67 and presents a high impedance to that line. Storage element or latch 110 also has a control terminal 114 for receiving a control signal which, as shown in FIG. 6, is also C61. The control signal at terminal 114 causes storage element 110 to store the level on the corresponding line of node bus 67 when that control signal is actuated (i.e., when C61 deasserts). In general, a control signal is actuated during a single transition between states, such as either a rising or a falling edge, but not both.

Figure 7:
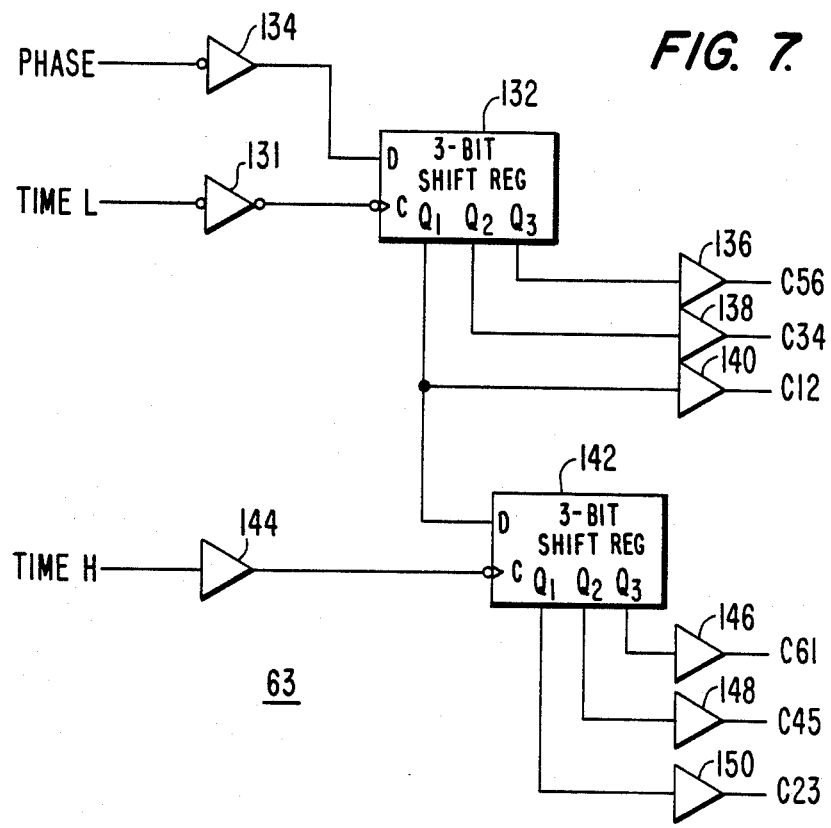
FIG. 7 is a block diagram of portions of clock decoder 63 shown in FIG. 2.

The interface apparatus also includes signal generating means coupled to the plurality of latches to generate drive and control signals to transfer the input data at the input terminals of the bus drivers through the bus to the latches as embodied herein. FIG. 7 shows an example of clock decoder 63 including circuitry to derive control signals such as signal C61. In FIG. 7, the Time L signal is received through buffer 131 and coupled to a clock input of a three bit shift register 132 The PHASE signal, after passing through buffer 134, is provided to the data input terminal of shift register 132. The Q1, Q2, and Q3 outputs of that register are passed through buffers 140, 138 and 136, respectively, to form the C12, C34, and C56 signals, respectively. The Q1 output of shift register 132 provides the data input to a three-bit shift register 142 whose clock input is coupled, through buffer 144, to the TIME H signal. The Q1, Q2, and Q3 outputs of register 142 are passed through buffers 150, 148, and 146 to form the C23, C45, and C61 signals, respectively. As FIG. 3 shows, the active portion of clock signal C61 in the preferred embodiment lasts for about one-third of the cycle of system bus 25.

The signal generating means includes first means for switching the drive signals from the first state to the second state at substantially the same time as the corresponding control signals are actuated. In other words, the drive signal need not remain an additional subcycle after the latch signal. In the preferred embodiment, clock decoder 63 generates timing signal C61 for both the driver and control signals. As explained previously, it is preferable to isolate the timing signal C61 which is sent to data interface 61 from the timing signal C61 which is sent to node specific logic 65 and thus storage element or latch 110. Both timing signals, however, are substantially the same. This signal isolation prevents characteristics of the node specific logic 65 from altering the timing signals presented to data interface 61, for example due to improper loading, and adversely affecting the servicing of data interface 61 by the timing signals in clock decoder 63.

Contrary to conventional approaches, there is no separate driver hold time for the bus lines. The absence of a separate driver hold time is possible with the present invention because the inherent capacitance of the bus lines is used to maintain the levels on those lines even when the node bus 67 is no longer being actively driven. Since the discharge paths for the line of node bus 67 are through the high input impedance of storage element 110 and the high output impedance of bus driver 82 when that driver is enabled, the voltage levels on the lines of node bus 67 remain relatively fixed for a predetermined period of time. That time can be calculated from the inherent bus capacitance, and the capacitances and impedances of driver 82 and storage element 110.

Figure 8:
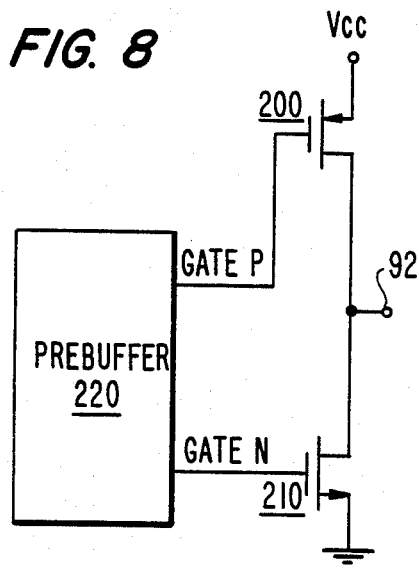
FIG. 8 shows a CMOS output circuit.

Preferably, the output circuitry for bus driver 82 is a CMOS driver as shown in FIG. 8. That circuitry includes a series-connected p-channel pull-up transistor 200 and n-channel pull-down transistor 210. The p-channel transistor 200 has a current path coupled between the supply voltage Vcc and output terminal 92. The n-channel transistor 210 has a current path coupled between the output terminal 92 and a reference terminal.

A prebuffer 220 sends out a GATE P signal to control the gate of the p-channel transistor 200 and a GATE N signal to control the gate of the n-channel transistor 210. When bus driver 82 is enabled, the GATE P and GATE N signals control transistors 200 and 210, respectively, to drive node bus 67 to either high or low levels, corresponding to "1" or "0" data. In particular, when node bus 67 is to be driven to a low level, the GATE P and GATE N signals are placed at a high level (approaching VCC); when node bus 67 is to be driven to a high level, GATE P and GATE N signal are placed at a low level (approaching ground). When bus driver 82 is disabled and terminal 90 is to be decoupled from the output terminal 92, then prebuffer 220 sets the GATE P signal at a high level and sets the GATE N at a low level. This disables both transistors 200 and 210 and presents to node bus 67 a high impedance, typically several megohms.

Figure 9:
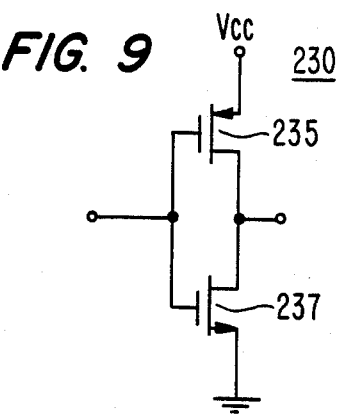
FIG. 9 shows a CMOS input circuit.

Preferably, the input circuitry for latch 110 is also standard CMOS circuitry. An example of this is shown in FIG. 9 by inverter circuit 230 comprising p-channel transistor 235 and n-channel transistor 237. The typical input impedance of the circuit in FIG. 9 is also of the order of several megohms.

By using driver 82 with the CMOS driver circuitry shown in FIG. 8, and by using storage element 110 with the CMOS input circuitry shown in FIG. 9, data is maintained on node bus 67 for what is effectively a "hold time" so at the falling edge of the control signal (C61) storage element 110 stores the level even though bus driver 82 has been disabled by its drive signal (also C61). In this manner, the "hold time" overlaps with what would normally be considered to be the "driver non-overlap time" in conventional bus driving circuits.

preferably, the timing insures that the control signal is actuated during the "window" when the data is valid on the bus. As indicated, however, the present circuitry allows an extension of that window past the time that bus driver 82 ceases actively driving node bus 67.

For bidirectional communication over that same line of node bus 67, another driver/storage element pair is needed for transmitting data from the node specific logic 65 to the system bus 25. As shown in FIG. 6, node specific logic 65 includes a bus driver 120 having an input terminal 121, an output terminal 122, and an enable terminal 124. Preferably, bus driver 120 is structurally similar to bus driver 82. The input terminal 121 of bus driver 120 holds a second input level, shown in FIG. 6 as received from storage element 130, to be coupled to the same line of node bus 67 to which the output terminal 122 of bus driver 120 is coupled. The enable terminal 124 in the embodiment of the invention shown in FIG. 6 is connected to timing signal C34 which is also provided from clock decoder 63.

Data interface 61 preferably includes storage element or latch 70 as the complement to bus driver 120. Storage element 70 has an input terminal 71 and a control terminal 75. In the embodiment of the invention shown in FIG. 6, the control signal at control terminal 75 is also signal C34.

The signal generating means for the interface apparatus for providing bidirectional communication generates the different driver control signals for storage elements 70 and 110 and bus drivers 82 and 120 to transfer the data at the respective inputs of bus drivers 82 and 120 to node bus 67. That signal generating means includes means (1) for switching the drive signals for one of the bus drivers between a first and second state, thereby at substantially the same time as the control signals for the corresponding latches are actuated, (2) for switching the drive signals between the first and second state for the other of the bus drivers at substantially the same time as the control signals for the corresponding latches are actuated, and (3) for ensuring that the first and second drive signals are not simultaneously in the first state.

Clock decoder 63, as shown in FIG. 7, generates timing signals C61 and C34 which do not overlap as can be seen from FIG. 3. Indeed, there are time periods between timing signals C34 and C61 corresponding to subcycles 2 and 5 and those time periods ensure that the node bus 67 will not be concurrently driven by bus drivers 82 and 120.

Figure 10:
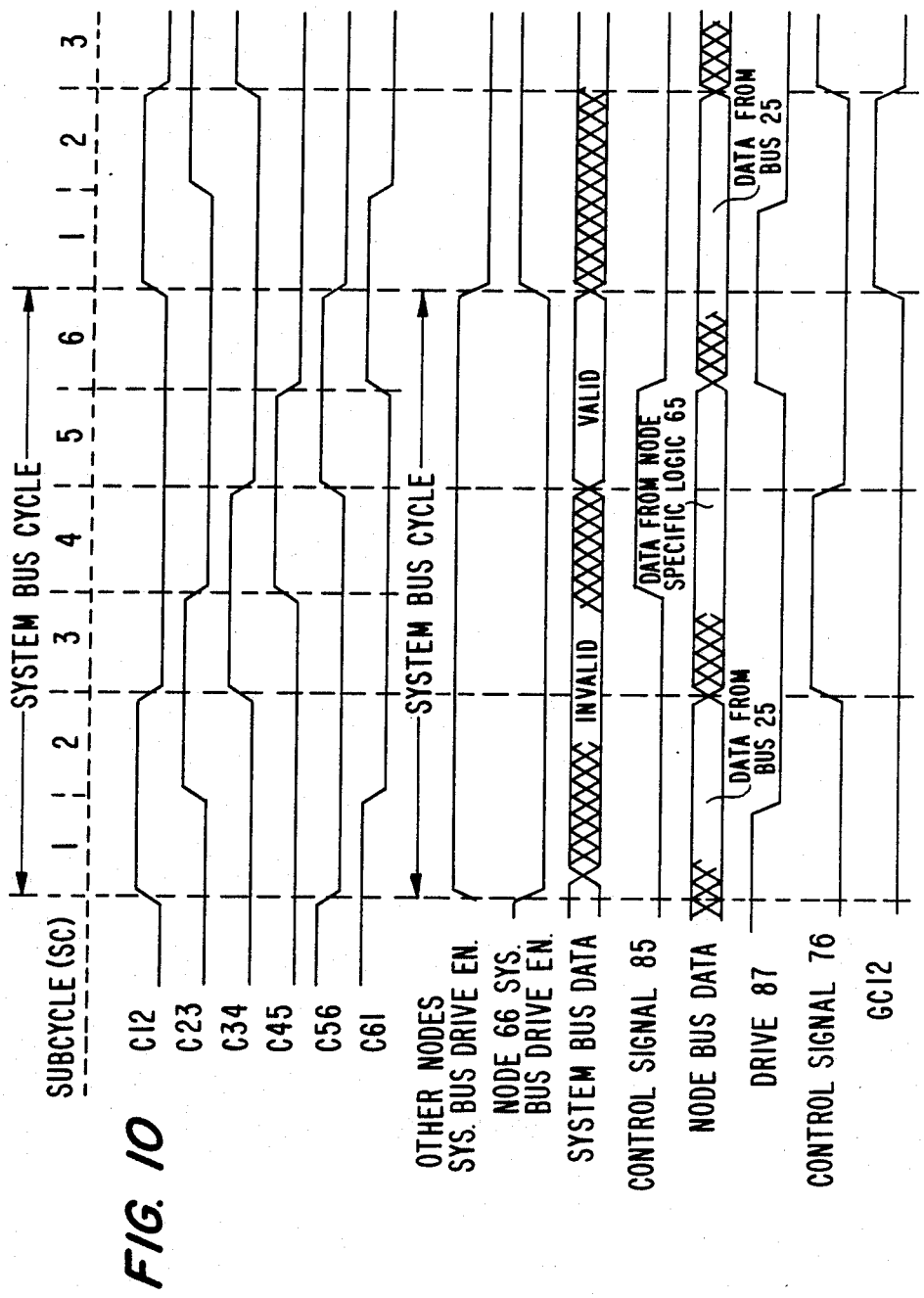
FIG. 10 shows timing signals for the node bus 67 shown in FIG. 2.

The entire bidirectional data transfer operation, as well as its relationship to the other transfers through data interface 1, may be understood from the timing diagram of FIG. 10. In FIG. 10, timing signal C12 through C61 are reproduced as well as the present and previous system bus drive enables, the periods of valid data on system bus 25, and control signal 85. When timing signal C45 deasserts at the end of subcycle 5, the data on system bus 25 is valid, and transparent latch 80 captures that valid data. That data is then transmitted to node bus 67 while timing signal C61 is active because that timing signal, also shown as Drive 87, enables bus driver 82. At the end of subcycle 1, i.e., when timing signal C61 is deasserted, storage element 110 captures the data from node bus 67. In this way, the data from system bus 25 is transferred to storage element 110 once each cycle of system bus 25.

During subcycles 3 and 4 of that same system bus cycle, while timing signal C61 was not active, bus driver 120 transferred the data in storage element 130 to node bus 67. As FIG. 6 shows, when C34 is asserted, it enables bus driver 120. At the end of subcycle 4, when C34 is deasserted, the data which had been transferred to node bus 67 by bus driver 120 is captured by storage element 70 because of control signal 76 shown in FIG. 10. Later, at the end of subcycle 2, the data in storage element 70 would be captured by storage element 72 if the node had access to the bus such that GC12 was asserted.

C. Interface System

The interface system of the present invention provides bidirectional communication between a node and a system bus. The system bus, such as system bus 25 (FIG. 2), propagates data during repetitive bus cycles and the node, such as node 60, has a user portion, such as node specific logic 65, for processing the data. The interface system comprises a node bus, such as node bus 67, which is coupled to node specific logic 65 and transfers data in parallel.

In accordance with the interface system for the present invention, transceiver means are coupled between the node bus and the system bus for providing bidirectional communication between the system bus and the node bus and for providing to the node bus a copy of all the data propagated on the system bus. In the preferred embodiment of the invention, data interface 61 provides such bidirectional communication.

Further in accordance with the present invention, transceiver means includes first and second unidirectional communications means. The first unidirectional communication means has input terminals coupled to the node bus and output terminals coupled to the system bus and receives data from the node bus to be transferred to the system bus during selected cycles of the system bus. As shown in FIGS. 4 and 6 the first unidirectional communications means in the preferred embodiment of the present invention includes storage elements or latches 70 and 72 and bus driver 74. Storage element 70 has an input terminal 71 coupled to the node bus. The output of storage element 70 is coupled to storage element 72. Bus driver 74 is coupled to the output of storage element 72 and has an output terminal 77 coupled to system bus 25.

As described above, data is received from node bus 67 into storage element 70 during the actuating portion (e.g., fall time) of clock C34. That data is then transferred to storage element 72 when it is actuated by signal GC12 as shown in FIG. 10. Signal GC12 is the logical AND of two signals, C12 and GC12EN. The C12 signal shown in FIGS. 3 and 10 is one of the timing signals generated by clock decoder 63, and GC12EN is a signal which, when active, indicates that node 60 will be a transmitter on system bus 25 and that data can then be transferred out of data interface 61 onto system bus 25. The GC12EN signal is generated by clock decoder 63 using signals from arbiter 28 (FIG. 1) and node specific logic 65.

As shown in FIGS. 4 and 6, driver 74 has as its input a drive signal called System Bus Drive enable 79 which is also received from clock decoder 63 and which causes the data in storage element 72 to be transferred onto system bus 25. The System Bus Drive enable 79 signal is based upon requests from node specific logic 65 as well as on certain grant signals received from the data processing system 20. Thus, data is transferred onto system bus 25 only during the cycles of system bus 25 when node 60 is a transmitter.

The second unidirectional communication means, in accordance with the present invention, has input terminals coupled to the system bus and output terminals coupled to the node bus. The input and output terminals of the second unidirectional communication means are each respectively coupled to the corresponding output and input terminals of the first unidirectional communication means. The second unidirectional communication means transfers data progagated on the system bus to the node bus once every cycle of the system bus.

As shown in FIGS. 4 and 6, storage element or latch 80 has an input terminal coupled to system bus 25 and is enabled by clock signal C45DM control line 85 received from clock decoder 63. Bus driver 82 has an output terminal 92 coupled to node bus 67 and to the input terminal 71 of corresponding storage element 70. The enable terminal 94 of bus driver 82 is coupled to the C61 signal.

The interface system of the present invention also includes timing means, coupled to the first and second unidirectional communication means, for controlling those means. According to the present invention, the timing means controls the first unidirectional communication means to receive the data from the node bus during selected active portions of a first clock signal and controls the second unidirectional communication means to transfer the data from the system bus to the node bus during active portions of a second clock signal. The timing means also generates the first and second clock signals so that the active portions of those clock signals occur once each cycle and do not overlap.

As explained previously, clock decoder 63 generates clock signals C34 and C61. Storage element 70 receives data at the end of clock C34 and transfers that data to system bus 25 during selected ones of the cycles of system bus 25. Furthermore, storage element 80 receives data from system bus 25 during timing signal C45 and driver 82 transfers that data to node bus 67 during the C61 clock cycle. Thus, data transferred during each cycle of system bus 25 are also transferred to node bus 67 to allow node bus 67, and therefore node specific logic 65, to obtain a picture of all messages transmitted on system bus 25. Since clock cycles C45 and C61 occur once per system bus cycle, the transfer from system bus 25 to node bus 67 also occurs once per cycle of system bus 25.

When used together, the bus interface circuitry and interface system of this invention provide several advantages over prior art systems. Those advantages include high speed bus transfer using a minimum number of clock signals and provides high speed data transfer between buses so that one bus, e.g., a node bus, can obtain a copy of all the messages transmitted via another bus, such as the system bus. By providing such a copy and using a single pin connection to system bus 25, a node coupled to the node bus can monitor its own messages and send messages back to itself by way of the system bus so other nodes can monitor those messages.

It will be apparent to those skilled in the art that various modifications and variations can be made in the bus interface circuitry and interface system of this invention without departing from the spirit or scope of the present invention. The present invention covers such modifications and variations which are within the scope of the appended claims and their equivalents.

What is claimed is:

1. An interface system for providing bidirectional communication for a node and a system bus propagating data during repetitive bus cycles, said node having a user portion for processing the data and said interface system comprising:

a node bus, coupled to said user portion, for transferring the data to and from the node;

transceiver means, coupled between said node bus and said system bus, for providing bidirectional communication between said system bus and said node bus and for providing to said node bus a copy of all of the data propagated on said system bus, said transceiver means including first unidirectional communications means, responsive to active portions of a first clock signal occurring once each system bus cycle and having input terminals coupled to said node bus and output terminals coupled to said system bus, for receiving data from said node bus for later transfer to said system bus during selected cycles of said system bus, and second unidirectional communication means, responsive to active portions of a second clock signal occurring once each system bus cycle and having input terminals coupled to said system bus and output terminals coupled said node bus for transferring the data propagated on said system bus to said node bus once every cycle of said system bus, each of said input terminals being connected to a different one of said output terminals of said first unidirectional communication means and each of said output terminals being connected to a different one of said input terminals of said first unidirectional communications means; and timing means, coupled to said first and second unidirectional communication means, for providing said first and second clock signals so that the active portions of the first and second clock signals occur do not occur simultaneously, and so that the active portions of the second clock signals cause the second unidirectional communication means to return to the node bus a copy of any data transferred to the system bus from the node bus.

2. The interface system of claim 1 wherein said first unidirectional communication means includes first storage means, coupled to said input terminals of said first unidirectional communication means, for temporarily storing the data from said node bus during the active portions of the first clock signal, and first bus driver means, coupled to said first storage means and to said output terminals of said first unidirectional communication means, for transferring the stored data from said first storage means to said system bus during selected active portions of a third clock signal synchronized with the first clock cycle.

3. The interface system of claim 2 wherein said second unidirectional communication means includes
   second storage means, coupled to said input terminals of said second unidirectional storage means, for temporarily storing the data propagated on said system bus, and
   second bus driver means, coupled to said second storage means and to said output terminals of said second unidirectional storage means, for transferring the stored data from said second storage means to said node bus during the active portions of the second clock signals.

4. The interface system of claim 2 wherein said first storage means includes two sequentially coupled storage elements to provide two-stage storage of data received from the node bus.

5. The interface system of claim 2 wherein said timing means includes second means for forming said third clock signal from signals generated from said user portion and from timing signals received from said system bus.

6. Data transfer apparatus for providing bidirectional communication for a node and a system bus propagating data during repetitive bus cycles, said node having a user portion for processing the data and said apparatus comprising:
   a node bus, including a plurality of lines each having an inherent electrical capacitance, for transferring the data by maintaining on said node bus for a predetermined period of time voltage levels representing the data;
   node bus interface means, coupled between said user portion and said node bus, for transferring the data between said node bus and said user portion, said node bus interface means
      a plurality of first bus drivers each corresponding to a different line of said node bus and each including
         an input terminal for holding first input data to be transmitted to the corresponding line of said node bus,
         a bus interface terminal coupled to the corresponding line of said node bus, and
         an enable terminal for receiving a first drive signal which, in a first state, causes the first bus driver to drive the corresponding node bus line to one of two levels according to the first input data and, in a second state, causes the first bus driver to cease driving the corresponding bus line and present a high electrical impedance at its bus interface terminal;
      a plurality of first latches each corresponding to a different line of said node bus and each including
         an input terminal coupled to the corresponding line of said node bus, the first latch presenting a high electrical impedance at its input terminal, and
         a latch control terminal for receiving a first control signal that causes the first latch to store the voltage level on the corresponding node bus line when the first control signal is actuated;
   transceiver means, coupled between said node bus and said system bus, for providing bidirectional communication between said system bus and said node bus and for providing to said node bus a copy of all of the data propagated on said system bus, said transceiver means including
      first unidirectional communications means, having input terminals coupled to said node bus and output terminals coupled to said system bus, for receiving data from said node bus to be transferred to said system bus during selected cycles of said system bus, said first unidirectional communications means including
         a plurality of second latches each corresponding to a different line of said node bus and each including
            an input terminal coupled to the corresponding line of said node bus, the second latch presenting a high electrical impedance at its input terminal, and
            a latch control terminal for receiving a second control signal that causes the second latch to store the voltage level on the corresponding node bus line when the second control signal is actuated; and
      second unidirectional communication means, having input terminals coupled to said system bus and output terminals coupled said node bus, each of said output terminals being connected to a different one of said input terminals of said first unidirectional communications means, for transferring the data propagated on said system bus to said node bus once every cycle of said system bus, said second unidirectional communication means including
         a plurality of second bus drivers each corresponding to a different line of said node bus and each including
            an input terminal for holding second input data to be transmitted to the corresponding line of said node bus,
            a bus interface terminal coupled to the corresponding line of said node bus, and
            drive signal which, in a first state, causes the second bus driver to drive said corresponding node bus line to one of two levels according to the second input data and, in a second state, causes the second bus driver to cease driving the corresponding bus line and present a high electrical impedance at its bus interface terminal, and
      timing means, coupled to said node bus interface means and to said first and second unidirectional communication means, for controlling the transfer of data between said user portion and said system bus, said timing means including means for switching the first drive signals from the first state into the second state at substantially the same time as the second control signals are actuated, for switching the second drive signals from the first state into the second state at substantially the same time as the first control signals are actuated, and for ensuring that the first and second drive signals are not simultaneously in the first state.

7. The data transfer apparatus of claim 6 wherein said first unidirectional communication means each includes a plurality of third bus drivers, each coupled to a different one of said plurality of second latches for transferring the stored voltage levels from said second latches to said system bus during selected active portions of a third clock signal.

8. Data transfer apparatus of claim 6 wherein said second unidirectional communication means includes a plurality of third latches each coupled to a different one of said second bus drivers for temporarily storing the data propagated on said system bus.

9. Data transfer apparatus according to claim 7 wherein each of said second latches includes two sequentially coupled storage elements to provide two-stage storage of data received from the node bus.

10. Data transfer apparatus for providing bidirectional communication for a node and a system bus propagating data during repetitive bus cycles, said node having a user portion for processing the data and said data transfer apparatus comprising:

a node bus, including a plurality of lines each having an inherent electrical capacitance, for transferring the data by maintaining on said node bus for a predetermined period of time voltage levels representing the data;

node bus interface means, coupled between user portion and said node bus, for transferring the data between said node bus and said user portion, said node bus interface means including a plurality of first CMOS bus drivers each corresponding to a different line of said node bus and each including an input terminal for holding first input data to be transmitted to the corresponding line of said node bus, a bus interface terminal coupled to the corresponding line of said node bus, and an enable terminal for receiving a first drive signal which, in a first state, causes the first CMOS bus driver to drive the corresponding node bus line to one of two levels according to the first input data and, in a second state, causes the first CMOS bus driver to cease driving the corresponding bus line and present a high electrical impedance at its bus interface terminal, and a plurality of first CMOS latches each corresponding to a different line of said node bus and each including an input terminal coupled to the corresponding line of said node bus, the first CMOS latch presenting a high electrical impedance at its input terminal, and a latch control terminal for receiving a first control signal that causes the first latch to store data corresponding to the voltage level on the corresponding node bus when the first control signal switches between a first state and a second state;

transceiver means, coupled between said node bus and said system bus, for providing bidirectional communication between said system bus and said node bus and for providing to said node bus a copy of all of the data propagated on said system bus, said transceiver means including first unidirectional communication means, having input terminals coupled to said node bus and output terminals coupled to said system bus, for receiving data from said node bus to be transferred to said system bus during selected cycles of said system bus, said first unidirectional communication means including a plurality of second CMOS latches each corresponding to a different line of said node bus and each including an input terminal coupled to the corresponding line of said node bus, the second CMOS latch presenting a high electrical impedance at its input terminal, and a latch control terminal for receiving a second control signal that causes the second CMOS latch to store data corresponding to the voltage level on the corresponding node bus line when the second control signal line switches from a first to a second state, a plurality of CMOS Flip flops each corresponding to a different one of the plurality of second CMOS latches and each including an input terminal coupled to an output terminal of the corresponding one of the second CMOS latches, and a flip flop control terminal for receiving a third control signal that causes the CMOS flip flop to store the signal at the output of the corresponding second CMOS latch when the third control signal is actuated, and a plurality of second CMOS bus drivers each corresponding to a different line of said system bus and each including an input terminal coupled to an output of a corresponding one of said third latches, a bus interface terminal coupled to a corresponding line of said system bus, and an enable terminal for receiving a second drive signal which, in a first state, causes the second bus driver to drive said corresponding system bus line according to the output of said third latch, and second unidirectional communication means, having input terminals coupled to said system bus and output terminals coupled to said node bus, each of said output terminals being connected to a different one of said input terminals of said first unidirectional communication means and each of said input terminals being connected to a different one of said output terminals of said first unidirectional communication means, for transferring the data propagated on said system bus to said node bus once every cycle of said system bus, said second unidirectional communication means including a plurality of fourth CMOS latches each corresponding to a different line of said system bus and each including an input terminal coupled to an input terminal of said second undirectinal communication means, and a latch control signal for receiving a fourth control signal that causes the fourth latch to store data corresponding to the voltage level on the corresponding input terminal of said second unidirectional communication means, and a plurality of third CMOS bus drivers each corresponding to a different line of said node bus and to a different one of said plurality of fourth latches and each including an input terminal coupled to an output terminal of said fourth latch for holding second input data to be transmitted to the corresponding line of said node bus, a bus interface terminal coupled to the corresponding line of said node bus, and an enable terminal for receiving a third drive signal which, in a first state, causes the third bus driver to drive said corresponding node bus line to one of two levels according to the second input data and, in a second state, causes the third bus driver to cease driving the corresponding bus line and present a high electrical impedance at its bus interface terminal, and timing means, coupled to said node bus interface means and to the first and second unidirectional communication means, for controlling the transfer of data between said user portion and said system bus, said timing means including means for switching first drive signals and the second control signals between the first and second states at substantially the same time, for switching the third drive signals and the first control signals between the first and second states at substantially the same time, and for ensuring that the first and third drive signals are not simultaneously in the first state.

11. A method for high speed bidirectional communication between a first and a second terminal, said second terminal being used to hold data which is valid for a predetermined period of time during each of a plurality of repetitive cycles, the method comprising the steps of:

receiving first data from said first terminal during active portions of a first clock signal occurring during each of said repetitive cycles for selective transfer to said second terminal;

transferring second data from said second terminal to said first terminal during active portions of a second clock signal occurring during each of said repetitive cycles to provide to the first terminal all of the second data; and generating the first and second clock signals so that their active portions do not occur simultaneously and so the second data transferred to the first terminal includes a copy of the first data transferred to the second terminal.

12. The method of claim 11 wherein the step of receiving the first data includes the step of temporarily storing the first data during the active portion of the first clock signal, and wherein the step of transferring the second level includes the steps of temporarily storing the second data during active portions of a third clock signal.

13. The method of claim 12 further including the step of generating the third clock signal so that some part of its active portions occur at the same time as the active portions of the second clock signal.

14. The method of claim 11 wherein said step of transferring the second data from said second terminal includes the substep of storing the second data.

* * * * *